Patented Aug. 22, 1933

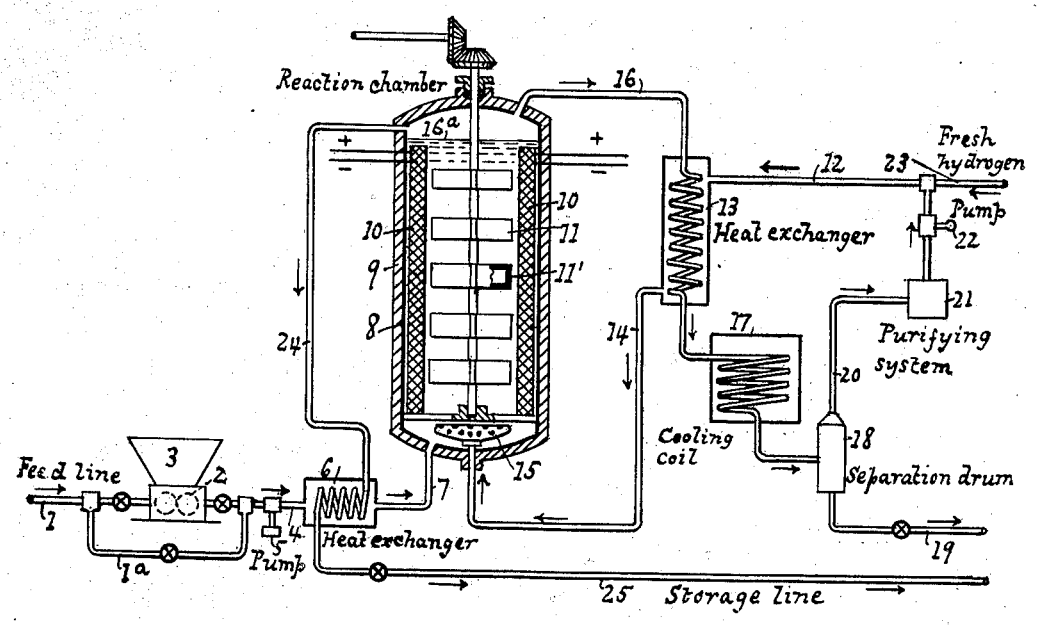

1,923,576

UNITED STATES PATENT OFFICE 1,923,576

CONVERSION OF SOLID FUELS AND PRODUCTS DERIVED THEREFROM OR OTHER MATERIALS INTO VALUABLE LIQUIDS

Carl Krauch, Ludwigshafen-on-the-Rhine, and Mathias Pier, Heidelberg, Germany, assignors, by mesne assignments, to Standard-I. G. Company, Linden, N. J., a Corporation of Delaware Original application February 6, 1926, Serial No. 86,646, and in Germany February 14, 1925. Divided and this application April 7, 1927. Serial No. 181,885

26 Claims. (Cl. 196—53)

One of the most important and widely agitated problems in the industrial world has for a long time been how to produce good gasoline or other valuable liquid fuels from distillable carbonaceous materials such as solid fuel including coal in all its varieties and wood, and products of distillation or mineral oils especially heavy oils.

One attempt at the solution of this problem has been made by the so-called liquefaction of coals by means of hydrogen or by destructive hydrogenation of tars or oils under a high pressure at high temperature but this has not reached application industrially because of an unsatisfactory speed and rate of the conversion.

By the process described in the specification of the original application No. 86,646 filed February 6th, 1926, of which this is a division, we claim to have successfully solved this problem for the first time and to be able to produce good pure liquid fuels, including also benzines from solid fuels and to convert also tars obtained from solid fuels and also heavy mineral oils, or crude oils, or residues into more valuable liquid products, including benzines, by a process economical in material, time, labour and wear of the apparatus.

In arriving at this result we have made several discoveries or inventions to certain of which this application is directed.

We conceived the idea of applying a catalyst to the said solid fuel or other materials, in connection with said hydrogenizing high pressure and high temperature process, but found that an improvement of the process could not be obtained at all or at least not in a continued operation. Thereafter we discovered that the cause of this drawback was the sulfur present in the treated material and we found that combined sulfur is a very suitable catalytic substance immune to sulfur poisoning.

Such combined sulfur may be added in different forms, for example of sulfides, single or mixed, also in mixture with metals, metalloids or oxids, hydroxids, or carbonates and the like, especially in mixture with catalysts promoting hydrogenation. Sulfids of heavy metals, particularly those of the iron group, whether alone or in mixtures, are of special efficiency. Sulfur may also be introduced in other forms, for example by adding sulfites or sulfates, or adding free sulfur to metals or metal oxids and the like and thereby generating a contact mass containing combined sulfur. Also by treating iron with sulfuretted hydrogen at an elevated temperature a contact mass of lasting efficiency can be produced.

The said catalysts may be added in any suitable manner. In the case of working with liquid materials they may be placed in the reaction vessel and the liquids brought into contact with them in a vaporized or otherwise finely divided state. When operating with solid carbonaceous materials the catalysts may be supplied to them by grinding both these materials and the catalysts and mixing the ground masses. Other bodies, for example, lumps of brick, quartz, asbestos, coke, active carbon, silica gel, metals, especially heavy metals, or metal oxids, or carbids, or mixtures of such bodies, may also be present in the reaction chamber. These additional bodies have a dispersing action accompanied in some cases, as for example in the case of active carbon, silica and metal carbides, by a catalytic action.

As regards the group of materials to be treated, the invention can be applied to any sort of solid fuels, for example, hard or soft coal, brown coal, lignite, peat, wood, or similar materials, mineral oils, shale oils, or other solid or liquid bitumens, also distillation or extraction products of all of them, such as tars obtained from them, whether by ordinary destructive distillation or by low temperature carbonization, or brown coal bitumen, or tars or oils obtained by pressure hydrogenation of solid or liquid fuels, or components or conversion products of all above mentioned materials, such as cracked products, cumarone or any other resins or residues of their distillation, pitch, asphaltum and so on, or mixtures of several such products with each other, also of solids with liquids or of one or more of such products with other suitable organic liquids.

Especially when employing coal or liquid fuels, an addition of lignite or peat is often of advantage, often increasing the hydrogenizing action, avoiding several drawbacks and in the case of solid substances rendering their introduction easier.

All the said materials may be used in the presence of substantial amounts of water and, if desired, water may be added as such. Sometimes the process of hydrogenation is hereby furthered. For example, lignite producer tar containing from 40 to 50 per cent of water may be used to advantage directly.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

The gases serving for the reaction may consist of hydrogen alone or of mixtures containing hydrogen, for example a mixture of hydrogen with nitrogen, or water gas, or hydrogen mixed with carbon dioxid, hydrogen sulphide, water vapor or methane or other hydrocarbons. Or the hydrogen may be generated in the reaction chamber by the interaction of water and, carbon monoxid, and by similar reactions. When employing nitrogen compounds as catalysts, and carbon monoxid and water the gas must be employed in a stream.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example temperature and pressure employed or duration of the treatment, the products are poor or rich in products of low boiling point. Generally the temperature ranges between 300 and 700 degrees centigrade, and when working under pressure, it should amount to 20, 50 or more atmospheres.

Compounds obtained by the aforedescribed hydrogenation treatment of solid fuels, tars, mineral oils and other materials referred to, which compounds may be comprised by the term destructively hydrogenized fuels are generally very low in sulfur or even completely free therefrom and are excellently suitable for use as fuel for internal combustion engines.

In the accompanying drawing an apparatus for carrying out the process according to the present invention is illustrated diagrammatically, partly in vertical section.

Referring to the drawing in detail reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid material in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example, 20, 100 or even as high as 1000 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and the catalytic materials 11' as indicated above may be attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum, for example at the point 16a and gas and vaporous products may be continuously withdrawn by vapor line 16 which is in communication with exchanger 13 and a cooling coil or condenser 17. The condensate and gas is discharged into a separating drum 18 from which the distillate is removed by line 19 to storage, not shown. The gas may be taken off by a pipe 20 to a purifying system indicated at 21, and which may comprise a scrubbing system preferably carried out at high pressure using, for example, soda to remove hydrogen sulfide and oil to remove hydrocarbon constituents from the gas. The hydrogen sulphide and the hydrocarbon constituents are removed from the gas in order to prevent their becoming too concentrated in the hydrogenating gas which, after some time, would lower the partial pressure of hydrogen to an undesirable extent and also, particularly due to the hydrogen sulphide, give rise to increasing attack on the constructional materials of the hydrogenating vessels. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and which is withdrawn to storage, not shown, by a suitable line 25.

In the following examples the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continually feeding liquid or difficultly varporizable oils, the rate of flow may be in the neighborhod of .3 to .8 volumes of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 litres per kilogram of carbonaceous material.

The following examples will serve to further explain how our invention is carried out in practice, but we do not restrict our invention to these examples.

*Example 1*

From 30 to 60 grams per hour of raw cresylic acid obtained from coal tar are passed together with from 300 to 600 liters of hydrogen under a pressure of 150 atmospheres and at a temperature of from 380 degrees to 400 degrees centigrade over from 30 to 50 cubic centimeters of a contact mass obtained by pressing precipitated cobalt sulfid into lumps. The reaction sets in vividly after a short while and proceeds at a constant velocity. In the product obtained by cooling, the phenols are largely reduced to hydrocarbons. Similarly, when treating coal tar or brown coal tar or raw distillates thereof, phenolic bodies contained therein are reduced to hydrocarbons to a satisfactory degree notwithstanding the presence of hydrocarbons and impurities, such as, sulfur compounds, pyridine, and the like; unsaturated compounds are converted into saturated ones, thin valuable oils being thus formed in a continuous operation without formation of asphaltum or coke.

In the above example, cobalt sulfid may be replaced by a mixture of the sulfids of cobalt and nickel, or of cobalt and manganese, or of cobalt and iron, or by zinc sulfid, or aluminium sulfid, or other contact masses containing combined sulfur.

*Example 2*

2.5 kilograms per hour of dark-colored residues of an American rock oil, which at ordinary temperature are nearly solid and have a strongly unsaturated character, are passed continuously together with 6000 liters of hydrogen under a pressure of 200 atmospheres and at from 450 degrees to 500 degrees centigrade over 3000 cubic centimeters of a contact mass prepared by forming precipitated cobalt sulfid. A light-colored, mobile liquid is produced besides a little methane, which on distillation yields 50 per cent of a fraction up to 150 degrees and additional 35 per cent up to 350 degrees centigrade, all of a saturated character. The small residues are viscous or vaseline-like and free of pitch.

In all of the above examples the hot parts of the apparatus may be lined or coated with aluminium or aluminium alloys or chromium or made of or coated with an alloy of 60 per cent of nickel, 27.7 per cent of iron, 12 per cent of chromium and 0.3 per cent of carbon; or an alloy composed of 58 per cent of nickel, 25 per cent of iron, 17 per cent of chromium and 0.3 per cent of carbon; or an alloy composed of 96 per cent of iron, 1.75 per cent of nickel, 1.5 per cent of chromium, 0.1 per cent of carbon and also of 0.25 per cent of silicon, 0.27 per cent of manganese, besides small quantities of copper, sulfur and phosphorus.

Our invention is not confined to the above examples; the conditions may be widely varied in various directions. For example the pressures and temperatures may be higher or lower than stated above.

In the appended claims, the expression "distillation and extraction products thereof" is intended to relate only to solid and liquid distillation and extraction products and is not to be construed to include normally gaseous products of the distillation of solid and liquid fuels.

Also, when the catalyst set forth in the claims is defined as being "added", it is not to be construed as necessarily meaning that the catalyst is introduced into the reaction chamber with each charge of carbonaceous material, but is to be construed to mean that the reaction is carried out in the presence of an effective quantity of a catalytic material which is not naturally contained in the carbonaceous material undergoing treatment or is contained in said carbonaceous material in ineffective quantities.

What we claim is:

1. The process of destructively hydrogenizing distillable carbonaceous substances of the nature of solid and liquid fuels, distillation and extraction products thereof into valuable liquids of different molecular weight which comprises treating them with hydrogen in the presence of an added solid catalyst containing a polyvalent metal and sulphur at a temperature sufficient to promote the conversion, and under a pressure of at least 20 atmospheres.

2. The process of destructively hydrogenizing distillable carbonaceous substances of the nature of solid and liquid fuels, distillation and extraction products thereof into valuable liquids of different molecular weight which comprises treating them with hydrogen in the presence of an added solid catalyst containing a heavy metal and sulphur at a temperature sufficient to promote the conversion, and under a pressure of at least 20 atmospheres.

3. The process of destructively hydrogenizing distillable carbonaceous substances of the nature of solid and liquid fuels, distillation and extraction products thereof into valuable liquids of different molecular weight which comprises treating them with hydrogen in the presence of an added polyvalent metal sulphide at a temperature sufficient to promote the conversion, and under a pressure of at least 20 atmospheres.

4. The process of destructively hydrogenizing distillable carbonaceous substances of the nature of solid and liquid fuels, distillation and extraction products thereof into valuable liquids of different molecular weight which comprises treating them with hydrogen in the presence of an added heavy metal sulphide at a temperature sufficient to promote the conversion, and under a pressure of at least 20 atmospheres.

5. The process of destructively hydrogenizing distillable carbonaceous substances of the nature of solid and liquid fuels, distillation and extraction products thereof into valuable liquids of different molecular weight which comprises treating them with hydrogen in the presence of an added solid catalyst containing a metal of the iron group and sulphur at a temperature sufficient to promote the conversion and under a pressure of at least 20 atmospheres.

6. The process of destructively hydrogenizing distillable carbonaceous substances of the nature of solid and liquid fuels, distillation and extraction products thereof into valuable liquids of different molecular weight which comprises treating them with hydrogen in the presence of an added sulphide of a metal of the iron group at a temperature sufficient to promote the conversion, and under a pressure of at least 20 atmospheres.

7. The process of destructively hydrogenizing distillable carbonaceous substances including naturally occurring solid and liquid fuels, distillation and extraction products thereof, into valuable liquids substantially free from asphaltum, which comprises charging a gas containing hydrogen with vapors of said substances and exposing the mixture to a pressure of at least 20 atmospheres and to heat at a temperature sufficient to promote conversion in the presence of an added solid catalyst containing a polyvalent metal and sulphur, the initial material and the hydrogen being continuously supplied to and the product and the hydrogen being continuously removed from the reaction chamber.

8. The process of destructively hydrogenizing distillable carbonaceous substances including naturally occurring solid and liquid fuels, distillation and extraction products thereof, into valuable liquids substantially free from asphaltum, which comprises charging a gas containing hydrogen with vapors of said substances and exposing the mixture to a pressure upwards of 100 atmospheres and to heat at a temperature sufficient to promote conversion in the presence of an added solid catalyst containing a heavy metal and sulphur and removing the product from the reaction chamber in admixture with the stream of escaping hydrogen.

9. The process of destructively hydrogenizing distillable carbonaceous substances including naturally occuring solid and liquid fuels, distillation and extraction products thereof, into valuable liquids substantially free from asphaltum, which comprises charging a gas containing hydrogen with vapors of the said substances and exposing the mixture to a pressure of at least 20 atmospheres and to heat at a temperature sufficient to promote conversion in the presence of an added polyvalent metal sulfid, removing the product from the reaction chamber in admixture with the stream of escaping hydrogen, separating the reaction product from the hydrogen and returning the hydrogen to the reaction zone.

10. The process of destructively hydrogenizing distillable carbonaceous substances of the nature of solid and liquid fuels, distillation and extraction products thereof into valuable liquids of different molecular weight which comprises charging a gas containing hydrogen with vapors of said substances and exposing the mixture to the action of an added heavy metal sulphide at a temperature sufficient to promote the conversion and under a pressure of at least 20 atmospheres.

11. The process of destructively hydrogenizing distillable carbonaceous substances including naturally occurring solid and liquid fuels, distillation and extraction products thereof, into valuable liquids substantially free from asphaltum, which comprises charging a gas containing hydrogen with vapors of said substances and exposing the mixture to a pressure upwards of 100 atmospheres and to heat at a temperature sufficient to promote conversion in the presence of an added heavy metal sulfid, removing the product from the reaction chamber as a vapor in the stream of escaping hydrogen, cooling the mixed steam in order to condense the hydrocarbon vapors and separating the hydrogen from the condensate.

12. The process of destructively hydrogenizing distillable carbonaceous substances including naturally occurring solid and liquid fuels, distillation and extraction products thereof, into valuable liquids substantially free from asphaltum, which comprises charging a gas containing hydrogen with vapors of said substances and exposing the mixture of a pressure of at least 20 atmospheres and to heat at a temperature sufficient to promote conversion in the presence of an added sulfid of a metal of the iron group, removing the product from the reaction chamber as a vapor in the stream of escaping hydrogen, cooling the mixed stream in order to condense the hydrocarbon vapors, separating the uncondensed hydrocarbons at least in part from the hydrogen, and recycling the hydrogen through the reaction vessel.

13. The process of destructively hydrogenizing distillable carbonaceous substances of the nature of solid and liquid fuels, distillation and extraction products thereof which comprises treating them with hydrogen in the presence of an added catalyst immune to sulphur poisoning comprising essentially a metal sulphide at a temperature between 300° and 700° C., and at a pressure ranging upwards of 100 atmospheres.

14. The process of converting distillable carbonaceous substances such as solid and liquid fuels, distillation and extraction products thereof, into valuable liquids, which comprises treating them with added hydrogen in the presence of an added solid catalyst containing a polyvalent metal and sulphur, at a temperature of between about 300° and 700° C. and at a pressure of at least 20 atmospheres.

15. The process of converting carbonaceous substances such as solid and liquid fuels, distillation and extraction products thereof, into valuable liquids, which comprises treating them with added hydrogen in the presence of an added solid catalyst containing a heavy metal and sulphur, at a temperature of between about 300° and 700° C. and at a pressure of at least 20 atmospheres.

16. The process of converting carbonaceous substances such as solid and liquid fuels, distillation and extraction products thereof, into valuable liquids which comprises treating them with added hydrogen in the presence of an added heavy metal sulfid, at a temperature of between about 300° and 700° C. and at a pressure of at least 20 atmospheres.

17. The process of converting carbonaceous substances such as solid and liquid fuels, distillation and extraction products thereof, into valuable liquids, which comprises treating them with a stream of hydrogen in the presence of an added heavy metal sulfid, at a temperature of between about 300° and 700° C. and at a pressure upwards of 100 atmospheres.

18. The process of converting carbonaceous substances such as solid and liquid fuels, distillation and extraction products thereof, into valuable liquids, which comprises treating them with added hydrogen in the presence of an added sulfid of a metal of the iron group, at a temperature of between about 300° and 700° C. and at a pressure upwards of 100 atmospheres.

19. The process of producing liquids from solid fuel materials, which comprises destructively hydrogenizing the initial material with added hydrogen in the presence of an added heavy metal sulfid, at a pressure of at least 20 atmospheres and at a temperature of between about 300° and 700° C.

20. The process of converting liquid carbonaceous substances into lighter hydrocarbons, which comprises destructively hydrogenizing the initial material with added hydrogen in the presence of an added heavy metal sulfid, at a pressure of at least 20 atmospheres and at a temperature of between about 300° and 700° C.

21. The process of destructively hydrogenizing distillable carbonaceous substances including naturally occurring solid and liquid fuels, distillation and extraction products thereof, into valuable liquids which comprises treating them with hydrogen in the presence of cobalt sulfid and heat at a temperature sufficient to promote conversion and at a pressure of at least 20 atmospheres.

22. The process of destructively hydrogenizing distillable carbonaceous substances including naturally occurring solid and liquid fuels, distillation and extraction products thereof, into valuable liquids, which comprises treating them with a stream of hydrogen in the presence of cobalt sulfid and heat at a temperature sufficient to promote conversion and at an elevated pressure of at least 20 atmospheres.

23. The process of destructively hydrogenizing distillable carbonaceous substances including naturally occurring solid and liquid fuels, distillation and extraction products thereof, into valuable liquids, which comprises charging a gas containing hydrogen with vapors of said substances and exposing the mixture to a pressure of at least 20 atmospheres and to heat at a temperature sufficient to promote conversion in the presence of cobalt sulfid.

24. The process of converting carbonaceous substances such as solid and liquid fuels, distillation and extraction products thereof, into valuable liquids, which comprises treating them with added hydrogen in the presence of added cobalt sulfid, at a temperature of between about 300° and 700° C. and at a pressure of at least 20 atmospheres.

25. The process of converting carbonaceous substances such as solid and liquid fuels, distillation and extraction products thereof, into valuable liquids, which comprises treating them with added hydrogen in the presence of zinc sulfid, at a temperature of between about 300° and 700° C. and at a pressure of at least 20 atmospheres.

26. The process of converting carbonaceous substances such as solid and liquid fuels, distillation and extraction products thereof, into valuable liquids, which comprises treating them with added hydrogen in the presence of manganese sulfid, at a temperature of between about 300° and 700° C. and at a pressure of at least 20 atmospheres.

CARL KRAUCH.
MATHIAS PIER.